No. 672,703. Patented Apr. 23, 1901.
W. V. ESMOND.
HOLDER FOR CAMERAS.
(Application filed May 5, 1899.)
(No Model.)
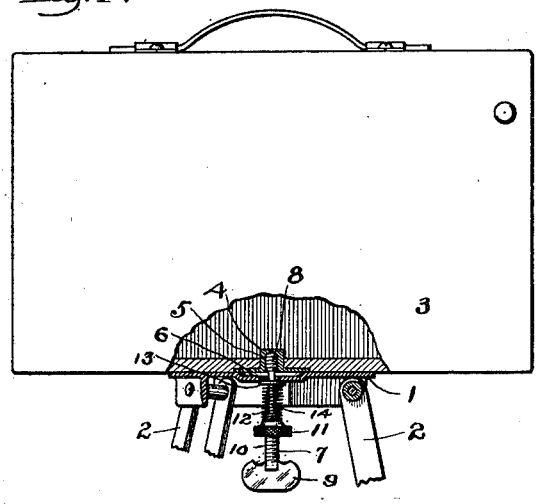
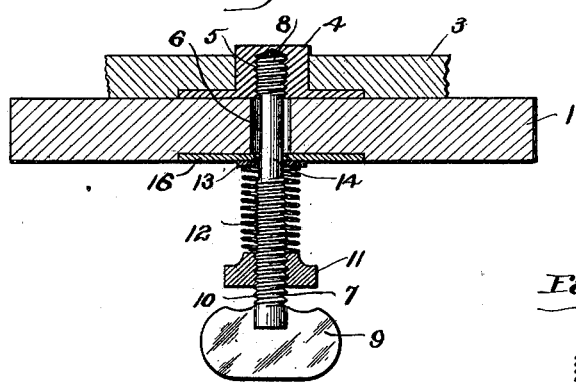
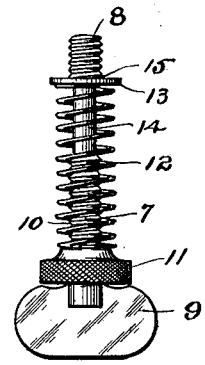
Witnesses:
Inventor:
William V Esmond
By Fred Gerlach
his Attorney.

UNITED STATES PATENT OFFICE.

WILLIAM V. ESMOND, OF CHICAGO, ILLINOIS, ASSIGNOR TO FRANK P. LEFFINGWELL, OF SAME PLACE.

HOLDER FOR CAMERAS.

SPECIFICATION forming part of Letters Patent No. 672,703, dated April 23, 1901.

Application filed May 5, 1899. Serial No. 715,645. (No model.)

*To all whom it may concern:*

Be it known that I, WILLIAM V. ESMOND, a citizen of the United States, residing at Chicago, in the county of Cook and State of Illinois, have invented certain new and useful Improvements in Holders for Cameras and other Articles, of which the following is a full, clear, and exact description.

It has heretofore been common practice to adjustably secure a camera to a rest upon a tripod or similar support by means of a screw engaging the rest, passing therethrough and into a screw-socket conveniently secured in the frame of the camera. The depth of the screw-socket is usually restricted, and the thickness of the rest varies according to the material used in its construction. Those constructed of metal are usually much thinner than those made of wood. As a result of such variation it has been customary to provide retaining-screws of different lengths corresponding to the different rests used. Furthermore, when such screws were employed it was necessary whenever the camera was to be revolubly adjusted on the rest to partially withdraw the screw from the socket before such adjustment could be effected.

One of the objects of the present invention is to provide a holding device for cameras and other articles which will permit a revoluble shift of the camera without a readjustment of the retaining-bolt.

A further object of the invention is to provide a retaining-screw and mechanism which can be used in connection with rests of different thicknesses.

With these objects in view the invention consists in the several novel features of construction hereinafter described, illustrated in the accompanying drawings, and more particularly defined in the claims at the conclusion hereof.

In the drawings, Figure 1 is a view, partly in elevation and partly in section, of a holder embodying the invention and showing also a camera sustained thereby. Fig. 2 is a sectional view, upon an enlarged scale, of such holder applied to a different form of rest. Fig. 3 is a detail plan view of the washer or pressure-plate which engages the rest. Fig. 4 is a side elevation of the holder withdrawn from the rest.

1 denotes a rest-plate of usual construction sustained by adjustable legs or supports 2. A camera case or frame 3 rests upon plate 1 and is provided with a socket-plate 4, having a female screw-thread 5 formed therein. Rest-plate 1 is provided with a screw-threaded hole 6, through which a retaining-bolt 7 is extended. The upper terminal of retaining-bolt 7 is provided with a screw-thread 8, corresponding to screw-thread 5 in socket-plate 4. At its lower terminal retaining-bolt 7 is provided with wings 9, whereby said bolt may be easily turned. Intermediate said wings and rest-plate 1 retaining-bolt 7 is provided with a screw-thread 10, which is encircled by a correspondingly-threaded adjusting-nut 11. A coil-spring 12 encircles the retaining-bolt and is engaged by nut 11, and the upper end of said spring impinges against a pressure-plate or washer 13. The retaining-bolt 7 is slightly reduced, as at 14, and the washer is free to play therealong and fits snugly about said reduced portion. Washer 13 when the holder is withdrawn from the socket-plate and rest abuts against the lower terminal of screw-thread 10 or a shoulder, as at 15, to restrict the movement of spring 12, and thus secures said spring in position around the retaining-bolt. Washer 13 is preferably formed of a flat strip of metal bent to encircle reduced portion of stem 14.

When a camera is to be secured upon the rest, the retaining-bolt 7 is passed through hole 6 in the rest-plate 1 and the bolt 7 turned to cause the screw-thread 8 to engage screw-thread 5 in socket-plate 4 until secured therein. At the same time washer 13 impinges against the under side of rest 1, and such washer is held firmly against said rest by spring 12. Thus the camera will be held firmly upon the rest, and the pressure of the washer 13 against the under side of the rest is sufficient to retain the camera in assigned position upon the rest, but also permits the camera and retaining-screw to be revolubly shifted upon and in the rest when such shift is desired. The desired pressure of washer 13 against rest 1 may be attained by adjustment of nut 11 along screw-thread 10.

It is manifest from the foregoing description that the camera may be revolubly shifted without a readjustment of the retaining-screw. This resultant advantage is an important one, because when the tripod or support has been adjusted to the desired position the camera can be easily and quickly revolved without likelihood of moving the tripod out of such previously-assigned position. It will also be observed that by adjustment of nut 11 along screw-thread 10 of retaining-bolt 7 washer 13 and spring 12 may be shifted to engage a thin rest-plate, of metal, as shown in Fig. 1, or a thicker rest, of wood, as shown in Fig. 2. This advantage is also important, because the retaining-bolt can be applied to the different rests now in use, and the necessity of providing retaining-screws of different lengths is avoided.

While the invention is particularly advantageous and useful for holding cameras, it may also be used for other and analogous purposes.

The invention is not to be understood as being restricted to the details shown and may be varied within wide limits without departing from the spirit of the invention.

The rest shown in Fig. 2 is of usual construction—that is, formed of wood and provided with a metal plate 16, having a central screw-threaded perforation corresponding to screw-thread 8 on the retaining-bolt. When thread 8 has been turned to a position above plate 16, shoulder 15 engages the thread in said perforation, and thus holds the retaining-bolt within the rest. In the construction shown in Fig. 1 the screw-thread is extended entirely through opening 6 in the metallic rest-plate, and shoulder 15 also retains the retaining-bolt in the plate.

Having thus described my invention, what I claim as new, and desire to secure by Letters Patent, is—

1. The combination with a suitable rest for a camera, provided with an opening having a screw-thread therein, of a retaining-bolt, having an external screw-thread at its upper terminal for engaging an internally-screw-threaded part in the camera to be held on said rest, means at the lower end of said bolt whereby it may be turned, a screw-thread near its lower end, a reduced portion intermediate said screw-threads, a washer having a restricted longitudinal movement on said reduced portion, an adjusting-nut, and a spring intermediate said nut and washer, said external thread on the upper end of said bolt being formed to engage the thread in the opening in said rest and to be projected completely therethrough.

2. As an article of manufacture a retaining-bolt for securing a camera to a rest-plate, having an external screw-thread at one end, a screw-thread near its other end, a slightly-reduced portion and means at its other end whereby said bolt may be turned, a washer encircling said reduced portion, an adjusting-nut, and a spring intermediate said nut and said washer, said washer being held on said reduced portion by said end screw-thread alone.

WILLIAM V. ESMOND.

Witnesses:
 FRED GERLACH,
 OLIVER P. DENNIS.